Aug. 22, 1967          E. F. VINCENT             3,337,762
     COAXIAL GAS DISCHARGE LAMP WITH A HOLLOW
              CENTER FOR PUMPING LASERS
                 Filed June 14, 1966
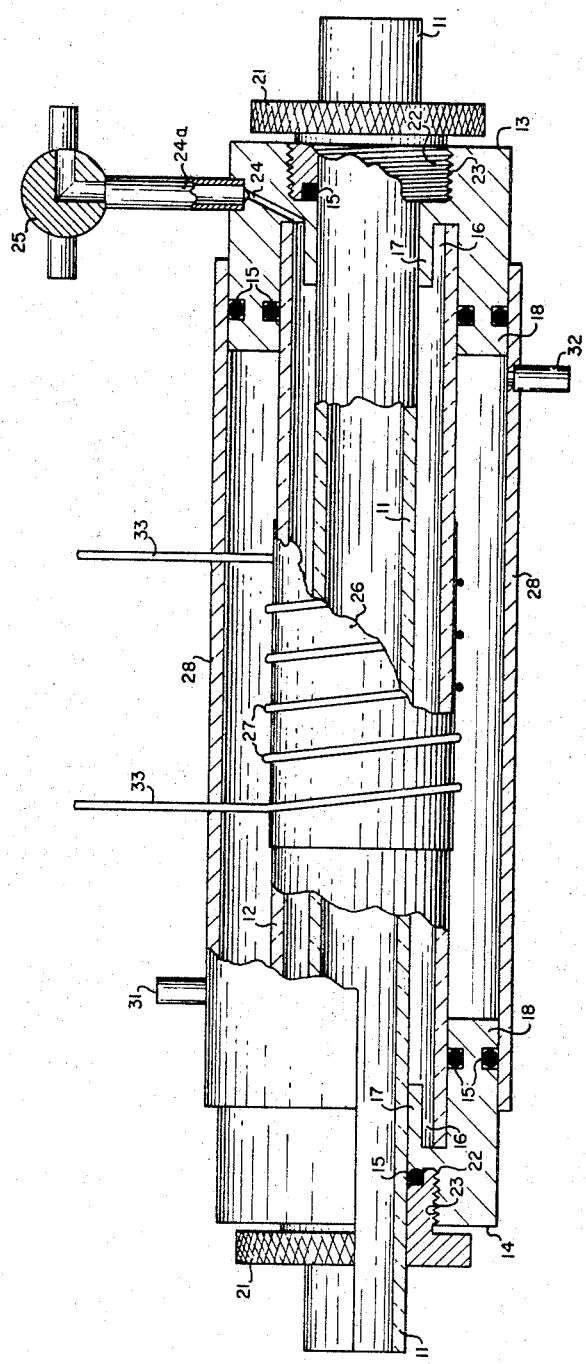
INVENTOR
EDWIN F. VINCENT
BY *Melvin L. Crane* AGENT
*signature* ATTORNEY United States Patent Office 3,337,762
Patented Aug. 22, 1967

3,337,762
COAXIAL GAS DISCHARGE LAMP WITH A HOLLOW CENTER FOR PUMPING LASERS
Edwin F. Vincent, 6004 Napoli Road,
Camp Springs, Md. 20031
Filed June 14, 1966, Ser. No. 558,218
8 Claims. (Cl. 313—7)

The invention described herein may be manufactured and used by or for the Government of the United States of America for governmental purposes without the payment of any royalties thereon or therefor.

The present invention relates to lasers and more particularly to a device for producing high-intensity flash, light sources for pumping lasers to obtain high energy level outputs in very short times.

It is well known in the art that laser operation requires an active material that will produce stimulated emission of radiation, an excitation source that pumps power into the active material, and a resonant structure. Heretofore, various systems of different light sources have been used for pumping lasers, such systems include exploding wires, exploding materials surrounding the active material, gas discharge devices, the usual and well known flash tube of different types, and light sources reflected by mirrors surrounding a laser. Some of these systems have their limitations due to breakage, if high currents are passed through the system, nonuniform illumination, and relatively high rise time to produce initial laser action.

The device of the present invention provides a high-intensity light source for pumping a laser element. A high power, efficient light source is provided by a gas-filled coaxial tubular housing which is positioned about the laser element coaxial therewith. A cylindrical reflector is positioned about the cylindrical housing on the outside thereof for reflecting light back onto a laser element. Also associated with the coaxial gas-filled tubular housing is an ionization coil which is secured centrally about the tubular housing for the purpose of preionizing the gas within the housing. In order to provide cooling of the light source, a cylindrical housing may be placed around the light source housing through which a liquid or gas coolant may be supplied. A high energy electrical source is connected with electrodes at each end of the cylindrical coaxial housing to supply current to the gas-filled tube, thereby producing high light intensities coaxially about a laser element positioned within the coaxial tubular housing.

It is therefore an object of the present invention to provide an improved pumping light source for a laser element.

Another object is to provide an improved light source for a laser element in which the laser element is uniformly illuminated along its length.

Still another object is to provide a light source of rugged construction which can sustain very high currents to produce high light intensities in a very short time.

Yet another object is to provide a light source in which the gas within the housing may be varied in pressure and provided with different types of gas or a continuous gas flow, if desired.

While still another object is to provide a lamp source which may be cooled by either a gas or liquid coolant.

These as well as other objects and attendant features of the present invention will be readily apparent from the following description which refers to the drawings, wherein:

The drawing is a partial cross-sectional view of the device made in accordance to the present invention.

Referring now to the drawing, there is shown by illustration a partial cross-sectional view of the device illustrating the relationship of the various parts. The device comprises an elongated cylindrical tubular member 11 surrounded by an elongated cylindrical tubular member 12 which is coaxial therewith, of shorter length, and of greater diameter. Tubular members 11 and 12 are made of glass, quartz, or any other suitable light transparent material. The spacing between the two coaxial tubular members 11 and 12 is closed in a vacuum tight condition by end electrodes 13 and 14 and O-rings 15. The end electrodes are formed with a central aperture of a diameter sufficient to just slide over the inner tubular member 11 and with a groove 16 within which the outer ends of the outer cylindrical tubular member 12 fits. The groove 16 forms an inner wall 17 along the outer surface of the inner cylindrical tubular member. The end electrodes also have an outer cylindrical portion 18 that surrounds the outer wall surface of the outer cylindrical tubular member 12. An O-ring is placed around the outer surface of the inner tube and behind the inner wall 17 on the end electrode. A ring 21 that has a portion cut away and threads 22 on the outer surface of the cut away portion is screw-threaded into the outer threaded end 23 of the electrodes against the O-ring therein to secure the end electrodes to the inner tubular member in vacuum tightness.

One of the end electrodes is provided with a passage 24 therein for the admittance of a gas into the area confined by the two cylindrical coaxial tubular members through a tubular member 24a which is provided with a two-way valve 25 for the purpose of evacuating the area between the two coaxial cylindrical members and for admitting gas under pressure to the area confined therebetween. A gas medium admitted into the confined area of the tube may be admitted at any desired pressure and the gaseous medium may comprise any gases well known in the art such as xenon, argon, krypton, etc., and the like, or mixtures thereof, commonly used to fill conventional high-intensity electronic flash lamps.

The inner surface along a linear portion of the mid-section of the outer tubular member 12 may be coated with a light reflective coating or either provided with a reflecting sheet of metal 26 such as a thin sheet of aluminum which is secured about the outer surface of the mid-section of the outer tubular member 12. A coil of wire 27 is wound around the light reflective member and connnected with a suitable electrical source for pre-ionizing the gas or gaseous mixture within the lamp. The end electrodes are connected with a high energy capacitor bank by use of coaxial cables that have a very low inductance for the purpose of applying very high currents through the lamp. A cylindrical jacket 28 is secured around the lamp device and is provided with an inlet 31 and an outlet 32 for admitting a cooling water or gas for the purpose of cooling the lamp during use. The cooling jacket is provided with suitable apertures therein through which the wires 33 to the ionization coil passes.

The various elements are made and then assembled in the following manner. The metal reflector is placed around the outer tubular member of the flash lamp and then the ionization coil is wound around the reflector. The cooling housing is then placed around the outer tubular member of the lamp and the leads from the ionization coil are extended through the apertures in the wall of the cooling housing and brought outside thereof. The inner tubular member is placed within the outer tubular member of the lamp then the end electrodes with O-rings thereon are positioned over the inner tubular member and slid along the inner tubular member such that the outer tubular member is placed within the groove within each of the end electrodes and the outer surface of the electrodes are positioned within the tubular coolant housing. The O-ring is then placed around the inner tubular member and the securing rings for each of the electrodes is then screw-threaded into place against the O-ring wherein the O-ring is pressed against the inner tubular member for a vacuum seal therein. The flash lamp is now ready for securing the ionization coils to an electrical source and the end electrodes are now ready for connection with a capacitor source which provides very high currents for the flash lamp.

In operation of the device, a solid state laser rod of any suitable kind such as ruby, neodymium glass or any other desired laser material is placed within the inner tube in the area surrounded by the reflective material and the ionization coil. The flash lamp with the laser therein is positioned and secured within any suitable laser system for directing a laser beam onto any desired object or for any desired purpose. The end electrodes and the ionization coil are connected to their respective electrical sources. The area of the flash lamp confined between the inner tubular member and the outer tubular member is evacuated to any desired vacuum pressure, then a suitable gas mixture is admitted into the flash lamp at any desired pressure. Thus the laser is in place within the light source, the laser system is set up, the flash lamp has been evacuated and a gas admitted at a desired pressure and type of gas, and the cooling system has been connected as well as the electrical system. Thus, the device is ready for operation. The capacitor bank is charged and ready for firing, to direct a very high current through the lamp. Prior to the firing of the capacitor bank, an electrical current from an electrical source is directed through the ionization coil to preionize the gas within the flash lamp to initiate a discharge of the capacitor bank through the tube. Since the gas confined within the flash lamp is preionized, the gas is at a point such that a discharge from the capacitor bank makes maximum use of its current load in establishing a flash, light source from the gases within the tube. A flash lamp made in accordance to the present invention is capable of handling high voltages which enables the lamp to be double-pulsed for fast discharges.

In use of the above described coaxial lamp in a double-pulsing mode of operation, a ruby laser rod has been optically pumped so that the laser rod lased in times as short as 45 microseconds which is a time much shorter than that required for thermal oscillations in the rod. It has been established that the usual time for lasing with prior art devices is several hundred microseconds. It has been determined that the lasing time is so short that sound waves are not able to distort the crystal and thus produce additional modes of oscillation. It is also seen that the structure of the flash lamp of this invention illuminates the laser rod uniformly over its entire length.

A flash lamp made in accordance to the present invention permits the type of gas used in the tube to be varied and also allows the gas to flow continuously through the tube (where high gas purity must be achieved) or else allows the tube to be sealed by first evacuating the tube and then admitting the gas therein at a desired pressure and closing off the valve. Also the gas pressure in the tube can be changed very readily at any specified time.

Additionally, the coaxial tube flash lamp is inexpensively fabricated with standard sizes of tubing and requires no special glass handling techniques which involve heating. Thus the vacuum seals may be made with rubber or soft metal O-rings due to the fact that no heating is required in assembly of the flash lamp.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A flash lamp structure which comprises:
    an inner elongated tubular member,
    an outer elongated tubular member surrounding said inner member coaxial therewith with a radial spacing therebetween,
    end electrodes surrounding a portion of said inner tubular member and the ends of said outer tubular member,
    means associated with said end electrodes for vacuum sealing the space confined between said inner and outer tubular members by said end electrodes, and
    means through which said lamp may be evacuated and a gas admitted into the spacing between said inner and outer tubular members.

2. A flash lamp structure as claimed in claim 1, which includes:
    a light reflective means around the mid-section of said outer tubular member.

3. A flash lamp structure as claimed in claim 2, which includes:
    a coil surrounding said reflective means for ionizing gases within said flash lamp.

4. A flash lamp structure as claimed in claim 1, which includes:
    a jacket about said outer tubular member for confining a coolant therein about said outer tubular member.

5. A flash lamp structure as claimed in claim 4, in which a laser may be placed within said structure in coaxial alignment with said tubular members.

6. A flash lamp as claimed in claim 2, in which:
    said light reflective means is coated on the inner surface of said outer tubular member.

7. A flash lamp structure as claimed in claim 2, in which:
    said light reflective means is a light reflective metal cylinder surrounding said outer tubular member.

8. A flash lamp structure as claimed in claim 3, which includes:
    a jacket about said outer tubular member for confining a coolant therein about said outer tubular member.

References Cited

UNITED STATES PATENTS

| | | | |
|---|---|---|---|
| 2,269,819 | 1/1942 | Isenberg | 313—25 X |
| 3,262,004 | 7/1966 | Kellar | 313—220 |

JAMES W. LAWRENCE, *Primary Examiner.*

C. R. CAMPBELL, *Assistant Examiner.*

Disclaimer 3,337,762.—*Edwin F. Vincent*, Camp Springs, Md. COAXIAL GAS DISCHARGE LAMP WITH A HOLLOW CENTER FOR PUMPING LASERS. Patent dated Aug. 22, 1967. Disclaimer filed Jan. 17, 1969, by the inventor.

Hereby enters this disclaimer to claims 1, 2, and 6 of said patent.

[*Official Gazette April 8, 1969.*]